United States Patent [19]

Campbell et al.

[11] 4,199,767
[45] Apr. 22, 1980

[54] NOZZLE VALVE FOR INK JET PRINTERS

[75] Inventors: Alan S. Campbell; Jack H. Jennings, both of Lexington, Ky.

[73] Assignee: International Business Machines Corporation, Armonk, N.Y.

[21] Appl. No.: 12,987

[22] Filed: Feb. 21, 1979

[51] Int. Cl.² ............................................. G01D 15/18
[52] U.S. Cl. .................................... 346/75; 346/140 R
[58] Field of Search .............................. 346/75, 140 R

[56] References Cited

U.S. PATENT DOCUMENTS

| 3,839,721 | 10/1974 | Chen et al. | 346/140 ID X |
| 4,045,802 | 8/1977 | Fukazawa et al. | 346/75 X |

OTHER PUBLICATIONS

Vesci; A., Flow Reversing Valve for Ink Jet Head, IBM Tech. Disc. Bulletin, vol. 18, No. 12, May 1976, pp. 4138-4139.
Seitz; H. K., Nozzle Cleaning Process, IBM Tech. Disc. Bulletin, vol. 20, No. 2, Jul. 1977, pp. 786-788.
Hochberg, F., et al. Multinozzle Line Printer Using Electromagnetic Valving IBM Tech. Disc. Bulletin, vol. 16, No. 2, July 1973, pp. 467-8.
Hendriks, F., Magnetic Shutter Valve, IBM Tech. Disc. Bulletin, vol. 19, No. 7, December 1976, pp. 2788-9.

Primary Examiner—George H. Miller, Jr.
Attorney, Agent, or Firm—William J. Dick

[57] ABSTRACT

Disclosed is improved apparatus for inhibiting the emission of a stream of ink drops from the nozzle orifice of an ink jet printer. The apparatus comprises a valve which is located externally of the head associated with the nozzle, and adjacent the outlet orifice of the nozzle. The valve includes a resilient gate member which is mounted for movement with respect to the outlet orifice but adjacent thereto, the gate member being movable between a first position allowing an uninhibited emission of a stream of ink drops from the outlet orifice of the nozzle and a sealing position of the outlet orifice when the gate member is in a second position. In this connection, the outlet orifice serves as a seat for the gate member when the member is in the second position. Moreover, the gate member is preferably composed of a thin but resilient material which is biased into a sealing engagement with the seat at least when the gate member is in the second position.

17 Claims, 7 Drawing Figures

NOZZLE VALVE FOR INK JET PRINTERS

SUMMARY OF THE INVENTION

The present invention relates to ink jet printers and more particularly relates to an ink jet stream control valve at the nozzle orifice of the printing head of an ink jet printer.

Start up and shut down of ink jet printers of the continuous type, such as the IBM 6640 results in some dribbling from the nozzle and depositing on the machine of ink drops. Conventionally, the valve for the ink system in the ink jet printer is disposed before the head, the head being filled with ink. By locating the valve as close as possible to the nozzle or orifice outlet, shut down and start up of the ink stream may be accomplished without the dribbling which otherwise may occur upon start up or shut down of the printer. Moreover, an additional advantage is received in that the valve, by being located at the orifice as opposed to the inside of the head or upstream of the head, also serves to seal both the nozzle and the interior chamber within the head. In this manner, premature drying of the ink within the nozzle and outlet or orifice, sometimes causing clogs, can be eliminated.

The following references, which relate to valves for ink jet printers, are of interest:

U.S. Pat. No. 4,045,802, issued on Aug. 30, 1977; IBM Technical Disclosure Bulletin, Vol. 16, No. 2, July 1973, page 467, 468; IBM Technical Disclosure Bulletin, Vol. 18, No. 12, May 1976, pages 4138, 4139; IBM Technical Disclosure Bulletin, Vol. 19, No. 7, December 1976, pages 2788, 2789; IBM Technical Disclosure Bulletin, Vol. 20, No. 2, July 1977, pages 786, 787, 788.

As may be seen by examination of the above identified references, the '802 patent discloses a cap which is moved against the ink ejection head to seal the head against air entry, not for stream cutoff. The July 1973 Technical Disclosure Bulletin disclosed an electromagnetic valve which deflects the flow but does not seal the outlet orifice of the ink jet printer nozzle. The May 1976 Technical Disclosure Bulletin illustrates a cover for multiple nozzles in an ink jet printer, the cover 13 being generally disc shaped so as to effect a covering for the nozzle apertures, but ink still may flow from the orifices into the chamber formed within the cover 13. The purpose of the cover is for flow reversal in the head to reverse flush the nozzle orifice so as to dislodge clogs. The valve of the present invention prevents clogging.

The December 1976 Technical Disclosure Bulletin does illustrate the advantage of a quick cutoff of the ink stream but the sealing element is placed internally of the ink jet head still allowing ink to dribble from the opening or orifice at the nozzle outlet. The July 1977 Technical Disclosure Bulletin illustrates the use of a cap for sealing the nozzle orifice. None of the references cited uses a valve member which presses against the outlet orifice proper and has, by it pressing engagement against the orifice, a seal effected regardless of pump pressure against the member.

In view of the above, it is a principle object of the present invention to provide novel nozzle valve apparatus which may be positioned adjacent the outlet of the nozzle of an ink jet printer and may function with the nozzle orifice for either inhibiting the emission of the stream of ink drops from the nozzle or allowing the stream of ink drops to proceed uninhibited.

Another object of the present invention is to provide a nozzle apparatus in conjunction with the foregoing in which rapid cutoff or opening of the valve apparatus may take place so that the full pressure of the ink may be shut off without shut off "dribble" or turn on errant spray.

Still another object of the present invention is to provide novel nozzle valve apparatus which seals the entire ink passage from the orifice outlet of the nozzle into the ink system including the nozzle head so that clogging or the like does not occur due to drying out or crusting of the ink because of its exposure to the atmosphere.

Other objects and a more complete understanding of the invention may be had by referring to the following specification and claims taken in conjunction with the accompanying drawings in which:

IN THE DRAWINGS

DETAILED DESCRIPTION

Figure 1:
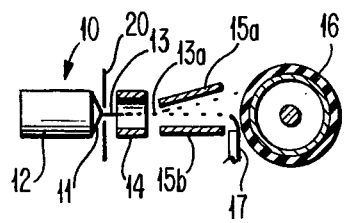
FIG. 1 is a schematic cross-sectional view in side elevation of a typical ink jet printer incorporating apparatus constructed in accordance with the present invention.

Turning now to the drawings, and especially FIG. 1, a schematic representation of a typical ink jet printer 10 is illustrated therein. The ink jet printer 10 illustrated in FIG. 1 is of the well known continuous sweep or on-the-fly printer such as the ink jet printer employing the well known Sweet process illustrated in U.S. Pat. No. 3,596,275 to Richard G. Sweet. In this type of printer, a carrier or the like (not shown) mounts the implements of printing, the printing implements including a nozzle 11 connected to a head 12 having a chamber (not shown) therein which contains pressurized ink fed thereto as by an ink system (not shown) including a pump or the like. A stream of ink 13 is emitted from the nozzle 11, and due to pressure perturbations is broken up into individual ink drops 13a which pass through a charge electrode 14 and then between deflection electrodes 15a, 15b to impinge upon print receiving media, in the illustrated instance a platen 16 having paper therearound for receiving the ink droplets 13a. Charge electrode 14 serves to charge the ink drops 13a to some predetermined level, the deflection electrodes having a fixed electric field therebetween formed by a high voltage power supply connected intermediate the electrodes 15a and 15b causing certain of the drops that are charged to be deflected upwardly so that a scan of drops is received on the print receiving media or platen 16. The carrier (not shown) which mounts the nozzle 11, head 12, charge electrode 14, deflection electrodes 15 and a gutter 17 moves into and out of the plane of the paper, the ink drops being disposed upon the print receiving media or platen 16 as by scanning in a vertical direction, the drops not receiving a charge being undeflected by the charge electrodes 15a and 15b and therefore propelling themselves into the gutter 17 for recirculation in and through the ink system and back to the head 12 for reuse. A typical ink recirculation system employed in this type of printer is illustrated in U.S. Pat. No. 3,929,071, issued on Dec. 30, 1975. Conventionally, the ink system includes a valve or the like adjacent the head 12 to cut off the flow when desired. However, when the ink flow is terminated or cut off prior to the head, no matter how fast the valve action, some pressure still exists in the head causing a dribbling of ink out of the nozzle onto the adjacent parts of the machine. After a considerable period of time, this ink build up can result in electrical problems such as shorting or associated charging problems of the stream 13 as it breaks into the ink drops 13a. Moreover, upon shut down of the machine, for example for a weekend or for longer periods such as during holiday vacation, the ink in the nozzle and in the head, by being exposed to air, will tend to dry up resulting in a crust like formation in the nozzle causing start up problems (i.e., misdirected ink spraying because of the ink stream breaking through only a portion of the crust thereby sending ink all over the charge electrodes and the deflection electrodes).

In accordance with the invention, a valve 20 is provided for engagement with the outlet orifice of the nozzle 11 to permit rapid cutoff of the ink stream and start up of the printer when desired, and when cutting off the stream, effectively sealing the ink supply and head from the atmosphere. To this end, and referring first to FIG. 2 wherein the preferred embodiment of the valve 20 is illustrated, the valve 20 includes a thin but resilient gate member 21, preferably arc shaped in cross section, and having longitudinally extending terminal edges 22 and 23 respectively which fit, for sliding movement with respect to the nozzle 11, in grooves 24 and 25 respectively which are located in extensions 12a and 12b in the present instance projecting from the head 12. As illustrated best in FIG. 3, the nozzle 11 includes means 11a defining an outlet orifice 11b in the terminal end of the nozzle 11. As will be seen, the means 11a defining the outlet orifice 11b also acts as a seat for the gate member 21.

In order to permit emission of the stream of ink drops when desired, and a rapid cutoff when it is desired to inhibit the flow or stream of ink drops, the gate member 21 is movable between a first position wherein the stream of ink drops may proceed uninhibited from the nozzle outlet orifice 11b, and then into a second position in which the gate member cooperates with the means defining the outlet orifice 11a, and due to the biasing action of the curved or arcuate thin resilient member serves to seal the nozzle outlet orifice thereby inhibiting ink stream emission from the nozzle.

To this end, the gate member 21 includes an aperture 26 having at least the diameter of the outlet orifice 11b of the nozzle 11, the gate member being alignable with the orifice 11b when the gate member is in the first position, and sealing the outlet orifice 11b when the gate member is in the second position, the means 11a defining the orifice 11b serving as a seat for the gate member when the gate member is in the second position.

Figure 2:
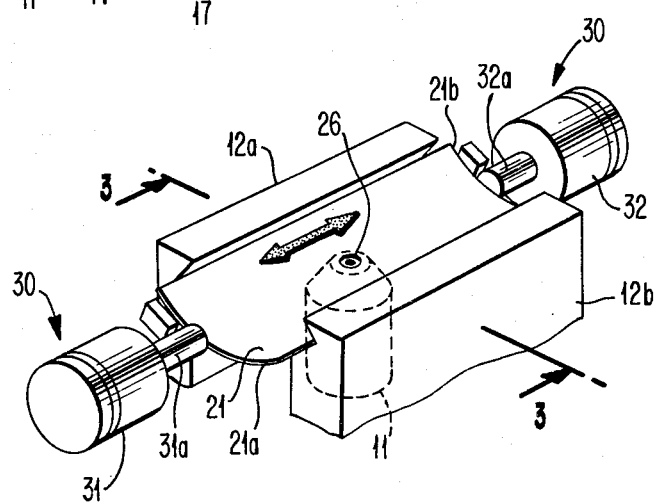
FIG. 2 is an enlarged fragmentary sectional view of a preferred valve structure constructed in accordance with the present invention.
Figure 4A:
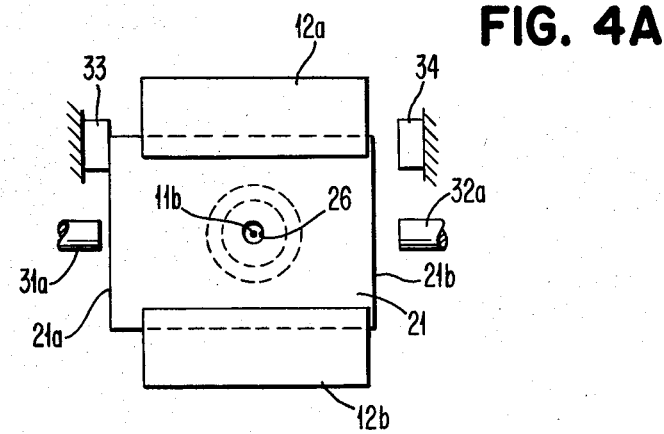
FIGS. 4A and 4B are schematic views of the apparatus illustrated in FIGS. 1–3 and showing the apparatus in a first position (FIG. 4A) in which the flow of ink droplets from the nozzle is uninhibited, and in FIG. 4B showing the valve structure in a second position in which the stream is cut off.
Figure 4B:
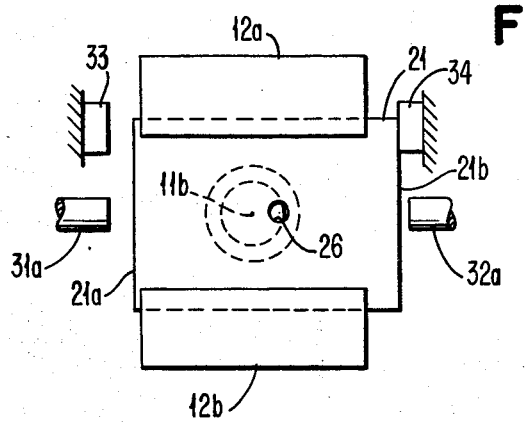

In order to move the gate member 21 from a first position wherein the aperture 26 in the gate member 21 is aligned with the orifice 11b of the nozzle 11, to a second position where the gate member serves to seal the outlet orifice 11b (see FIGS. 4A and 4B), actuator means operates to effect such movement of the gate member between the first and second positions. To this end, and as best illustrated in FIGS. 2 and 4, the actuator means 30 in the present instance comprises a pair of impulse solenoids 31 and 32, the solenoids having, as is conventional, projecting core members 31a, 32a and return springs (not shown) internally of the solenoids 31 and 32. The solenoids cores 31a and 32a are preferably positioned adjacent to but spaced from the laterally extending terminal ends 21a, 21b of the gate member 21 such that upon energization of one or the other of the impulse solenoids, the core member 31a or 32a will be driven a short distance by an energization current causing the core to pick up speed prior to its impact against the terminal edge 21a or 21b of the gate member 21. In order to limit the movement of the gate member so that the gate member is in the first position such as illustrated in FIG. 4A, the aperture 26 is positioned accurately with respect to the nozzle outlet orifice 11b, stop means 33 and 34 are provided on opposite ends of the gate members, and spaced therefrom an appropriate distance such that when the core 32a of the solenoid 32 has impacted against the edge 21b of the gate member 21 propelling the gate member to the left (relative to FIG. 4A) so that the aperture 26 aligns with a nozzle outlet orifice 11b, the edge 21a of the gate member 21 impinges upon the stop 33 thereby insuring accurate alignment. Alternatively, and as shown in FIG. 4B, when the core 31a of the impulse solenoid 31 has been energized so as to impact the edge 21a of the gate member 21, the gate member is propelled into the second position and impacts stop 34 (edge 21b) thereby limiting the movement of the gate member.

It should be recognized that the means for actuating the slide type gate member is important only to insure that stream cut off and cut on does occur extremely rapidly so that no dribbling occurs in the event of shut off, and no misdirection of the stream occurs during movement of the gate member into the free flow position. Moreover, by providing a curve or arcuate thin or resilient gate member 21, the arcuate and resilient nature of the gate member acts to bias the gate member into sealing engagement with the seat 11a (means defining the outlet orifice 11b) at least when the gate member is in the second position.

In this connection, very thin plastic or plasticized paper products may be employed as the gate member 21 or the gate member may be composed of metals or the like which are compatable with the nozzle orifice as well as the ink.

For example, in an actual embodiment, the gate member 21 was composed of a mylar having a thickness of 0.0635 mm, a longitudinal length of 7.62 mm along edges 22, 23, (supported length 3.0 mm) and a lateral length of 1.778 mm along edges 21a, 21b. Such a structure should seal against a pressure of 80 P.S.I. for thirty (30) minutes or longer without leaking and a rapid opening of the gate member should effect minimal misdirection of the ink stream. Moreover, it should be recognized that the actuator for the gate member may be comprised of, for example, a double acting solenoid which would be connected to the gate member for movement thereof between its first and second position, or by any other means which allow for a quick driving of the gate member between the two positions. However, the spaced drive or impulse solenoids 31 and 32 is the preferred means of energizing the gate member 21.

Figure 3:
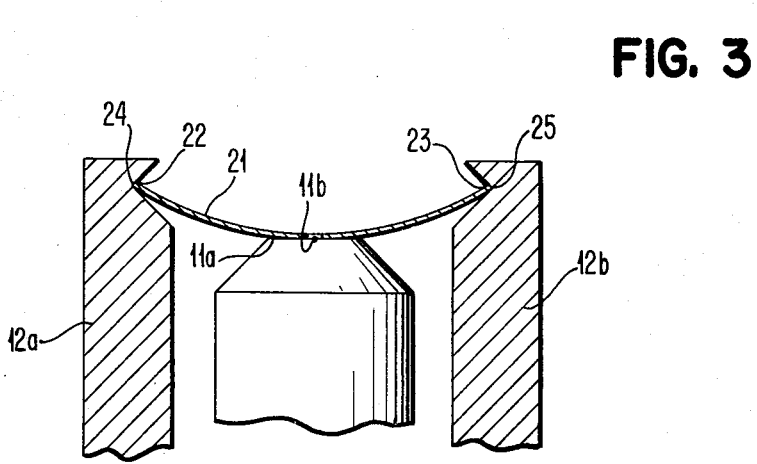
FIG. 3 is an enlarged fragmentary sectional view taken along line 3—3 of FIG. 2.
Figure 5:
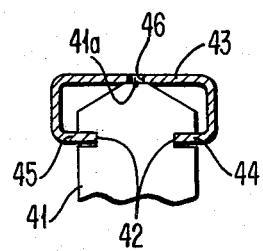
FIG. 5 is a fragmentary sectional view of another embodiment of apparatus constructed in accordance with the present invention.
Figure 6:
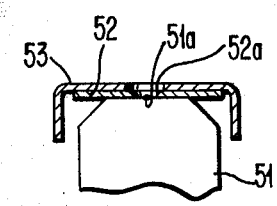
FIG. 6 is a fragmentary sectional view and side elevation of another embodiment of apparatus constructed in accordance with the present invention.

Alternate embodiments of the invention are illustrated in FIGS. 5 and 6. Referring first to FIG. 5, the ink jet head nozzle 41 is provided with grooves 42 in the sidewall thereof, in this connection, the gate member 21 illustrated in FIGS. 2–4 is replaced by a sliding but flexible valve gate member 43 having in-turned leg portions 44 and 45 which mate and coact with the grooves 42 in the side of the nozzle 41. The flexible or resilient valve gate member 43, like its couterpart gate member 21, is provided with an aperture 46 which is aligned with, when in a first position, the outlet orifice 41a of the nozzle 41, and when in a second position presses against the seat formed by the means defining the outlet orifice 41a thereby sealing off the nozzle 41. In this conection, the grooves 42 in the sidewall of the nozzle 41 and the pressure of the legs 44 and 45 against the upper portion of the grooves 42 serves to bias the member 43 against the means defining the orifice 41a to maintain pressure against the orifice so that the gate member will serve to seal the orifice 41a.

With regard to the embodiment shown in FIG. 6, a nozzle 51 is illustrated with an outlet orifice 51a. In order to insure positive closing off of the orifice 51a of the nozzle 41, a gate member 52, in a similar manner to gate member 21 and 43 illustrated respectively in FIGS. 2–4 and FIG. 5, includes an aperture or the like 52a which is alignable, when the gate member 52 is in the position illustrated in FIG. 6 so as to permit the stream to emit from the nozzle 51. As illustrated, the gate member 52 is pressed against the means defining the orifice 51a of the nozzle 51 as by a pressure plate or the like 53 which serves to bias the plate 52 against the surface of the nozzle orifice 51a. In both the embodiments illustrated in FIGS. 5 and 6, the gate members 43 and 52 are movable between the first and second position as heretofore defined for the gate member 21 so as to either allow flow or quickly cut off the same when the gate members are in the second position. Moreover, it should be recognized that in the embodiment illustrated in FIG. 5, the gate member is the member 43 and may be actuated or energized and moved between the first and second positions by the same techniques and apparatus described heretofore relative to the gate member 21. However, in the embodiment illustrated in FIG. 6, the gate member 52 is the only portion of that apparatus which is moved so as to permit alignment of the aperture 52a between the position aligned with the orifice 51a and a position wherein a gate member 52 cuts off the flow of ink from the orifice 51a of the nozzle 51.

Thus the apparatus of the present invention permits rapid turn on and turn off of a stream of ink in an ink jet printer while giving the side benefit of sealing of the head of the ink jet printer when the system is shut off to inhibit nozzle crusting and the like by inhibiting air entry into the nozzle structure.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed:

What is claimed is:

1. In an ink jet printer including a nozzle for emitting a stream of ink drops, said nozzle including means defining an outlet orifice, improved apparatus for controlling the emission of the said stream, said improved apparatus comprising valve means at said means defining an outlet orifice, said valve means including a gate member mounted for movement with respect to said means defining said outlet orifice but adjacent thereto, said gate member movable between a first position allowing an uninhibited emission of a stream of ink drops from said outlet orifice of said nozzle and a second position sealing said outlet orifice; said means defining said outlet orifice of said nozzle serving as a seat for said gate member when said member is in said second position, and means biasing said gate member into the sealing engagement with said seat at least when said gate member is in said second position.

2. In an ink jet printer in accordance with claim 1 wherein said gate member includes an aperture therein alignable with said orifice when said gate member is in said first position.

3. In an ink jet printer in accordance with claim 2 wherein said gate member is pressed into engagement with said means defining said orifice by a pressure plate which forms said biasing means.

4. In an ink jet printer in accordance with claim 1 including actuator means for moving said gate member between said first and second position.

5. In an ink jet printer in accordance with claim 4 wherein said actuator means are spaced from said gate member until energized.

6. In an ink jet printer in accordance with claim 1 wherein said gate member comprises a thin, arc shaped and resilient member.

7. In an ink jet printer in accordance with claim 6 wherein said arc shaped gate member has longitudinally extending terminal edges, and guide means engageable with said longitudinally extending terminal edges for guiding a path of movement of said gate member between said first and second positions.

8. In an ink jet printer in accordance with claim 7 wherein said path of movement maintains said gate member in pressing engagement with said means defining said outlet orifice.

9. In an ink jet printer in accordance with claim 8 wherein said guide means includes a pair of spaced apart head extensions having grooves therein defining said path of movement of said gate member.

10. In an ink jet printer in accordance with claim 8 wherein said guide means comprises grooves in said nozzle engageable by said terminal edges of said gate member.

11. In an ink jet printer in accordance with claim 10 wherein said terminal edges are in-turned.

12. An ink jet printer of the continuous type including a nozzle for emitting a stream of ink drops under pressure, said nozzle including means defining an outlet orifice, and a valve at said outlet orifice, said valve including a gate member having an aperture therein at least the diameter of said orifice, and movable between a first position aligning said aperture with said orifice and a second position in engagement with said means defining said orifice; and means to press said valve member against said means defining said orifice whereby, when said member is in said second position, said member seals said orifice.

13. An ink jet printer in accordance with claim 12 wherein said gate member comprises a thin, arc shaped and resilient member.

14. An ink jet printer in accordance with claim 13 wherein said arc shaped gate member has longitudinally extending terminal edges, and guide means engageable with said longitudinally extending terminal edges for guiding a path of movement of said gate member between said first and second positions.

15. An ink jet printer in accordance with claim 14 wherein said gate member moves in a sliding path engageable with said seat of said nozzle.

16. An ink jet printer in accordance with claim 15 including actuator means for moving said gate member between said first and second position.

17. An ink jet printer in accordance with claim 16 wherein said actuator means are spaced from said gate member until energized.